June 25, 1929.  E. F. W. ALEXANDERSON  1,718,515

RECTIFYING APPARATUS

Filed March 17, 1926

Inventor:
Ernst F. W. Alexanderson
by
His Attorney.

Patented June 25, 1929

1,718,515

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

RECTIFYING APPARATUS.

Application filed March 17, 1926. Serial No. 95,460.

My invention relates to apparatus for transmitting current between direct and alternating current circuits, and has for its principal object the provision of an improved means for excluding from the alternating current circuit the harmonics which tend to be produced when current is interchanged between such circuits through a mercury rectifier or the like.

In the operation of apparatus supplied with direct current from an alternating current circuit through a rectifier, it has been found that alternating current of a rectangular wave form is utilized, and that the harmonics of this current are likely to find their way into the alternating current circuit and to produce objectionable interference with telephone communication. In accordance with my invention, this difficulty is avoided by the provision of a tuned circuit whereby objectionable harmonics are excluded from the alternating current circuit.

My invention will be better understood from the following description when considered in connection with the accompanying drawings and its scope will be pointed out in the appended claims.

Figure 1:
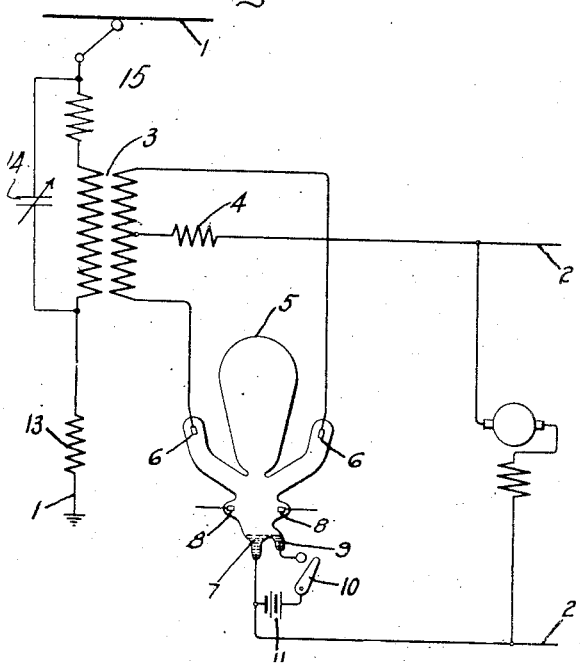
Figure 2:
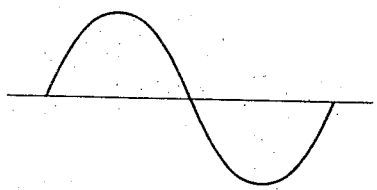
Figure 3:
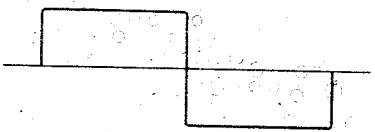

Referring to the drawings, Fig. 1 shows an apparatus wherein my invention has been embodied; and Figs. 2 and 3 are explanatory diagrams relating to the operation of the apparatus shown by the previous figure.

Fig. 1 shows an alternating current circuit 1 and a direct current circuit 2 which are interconnected through a transformer 3, a smoothing reactor 4 and a rectifier 5. This rectifier comprises anodes 6, a cathode 7, excitation electrodes 8 supplied with current from a suitable source connected between them and the cathode 7, and a starting electrode 9 adapted to be connected to the cathode 7 through a switch 10 and current supply means shown as a battery 11. A direct current motor is shown as connected to the direct current circuit 2. An inductance 13 is connected to the alternating circuit in series with the primary circuit of the transformer 1. A condenser 14 and an inductance 15 connected in circuit with the primary winding of the transformer 3 are utilized to store the energy of the higher harmonics.

Fig. 2 shows the wave shape of the line current, and Fig. 3 shows the wave shape of the current supplied through the transformer. It is well known that current of the wave form shown by Fig. 3 comprises a great number of harmonics. In order to ensure satisfactory operation of the line 1, it is essential that the current of this line has the wave form shown by Fig. 2. This result is accomplished by the tuned element through which the higher harmonic currents that tend to be produced in the alternating current line are suppressed.

The embodiment of the invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:—

1. The combination of direct and alternating current circuits, a rectifier, a transformer provided with primary and secondary windings connected respectively to said alternating current circuit and to said direct current circuit through said rectifier, and means comprising a plurality of reactors connected in series with said primary winding, and a condenser connected in shunt to said primary winding and one of said reactors.

2. The combination of direct and alternating current circuits, a rectifier, a transformer provided with primary and secondary windings connected respectively to said alternating current and to said direct current circuit through said rectifier, a reactor connected in series with said primary winding, and a condenser connected in shunt to said primary winding.

In witness whereof, I have hereunto set my hand this 15th day of March, 1926.

ERNST F. W. ALEXANDERSON.